United States Patent Office 3,262,887
Patented July 26, 1966

3,262,887
POLYMERIZATION CATALYSTS AND PROCESSES
John D. Calfee, Dayton, Ohio, assignor to Monsanto Company, a corporation of Delaware
No Drawing. Filed Aug. 31, 1960, Ser. No. 53,059
6 Claims. (Cl. 252—429)

This invention relates to polymerization processes. More particularly, this invention relates to complex catalyst compositions for use in heterogeneous polymerization systems.

It is an object of this invention to provide novel catalyst complexes for use in polymerizing organic material. It is another object of this invention to provide a method for making new and useful catalyst complex compositions. It is yet another object of this invention to provide new polymers obtained by effecting the polymerization of monomeric materials in the presence of the new catalyst compositions.

It has been found, in accordance with this invention, that if aluminum fluoride is formed in a chemically bonded catalyst complex composition by first preparing a chemical complex composition of an aluminum alkoxide having from 1 to 12 carbon atoms in each of the alkoxy radicals and an aluminum chloride, aluminum bromide, or aluminum iodide, and then reacting that chemical complex with a fluorinating agent to effect a halogen interchange wherein the fluoride ions replace the major part of the chloride, bromide, or iodide ions in the chemical complex, new and valuable properties are obtained. The catalyst compositions so obtained, containing the in situ prepared complex aluminum fluoride, are insoluble in the commonly used solvents for polymerization reactions. It is believed that the exceptional catalytic activity of these materials is due at least in part to the physical nature of the materials so prepared. As they precipitate from solution in the formation step, they are in extremely finely divided form. As a result, they are porous and possess great surface areas, and actually appear amorphous when viewed with a high-powered optical microscope. Catalysts of this invention have been examined by X-ray diffraction technique, which reveal the presence of sub-microscopic crystals, known as "crystallites." These crystallites have a radius of about 500 A. and lower, as determined by the technique of X-ray diffraction line broadening. Crystallite size measurements have further been confirmed by electron microscopy.

According to the Charles A. Kraus et al. patent, 2,440,750, issued May 4, 1948, there is provided a complex Friedel-Crafts catalyst consisting of an aluminum alkoxide and aluminum chloride. That catalyst complex is characterized by high solubility in a wide range of solvents, both aliphatic and aromatic, especially in aromatic hydrocarbons and in halo-substituted hydrocarbons. That catalyst system was designed for the purpose of operating in a homogeneous sytem, that is, a liquid system to effect the desired reaction. In contrast to the Kraus et al. catalyst complex, this invention provides an insoluble catalyst complex which will operate in a heterogeneous polymerization system and thus is not dependent upon a catalyst solvent for efficient activity.

It is believed that in the halogen interchange reaction the larger chlorine, bromine or iodine atoms in the chemical complex are replaced by the small fluoride atoms while retaining the chemical complex structure and providing large surface area for catalyst site activity. The catalyst compositions disclosed by the Kraus et al. patent are good starting materials for the preparation of the insoluble catalyst compositions of this invention.

In one aspect, then, this invention provides a novel chemically-bonded complex composition comprising an aluminum alkoxide, aluminum fluoride and permissibly containing minor amounts of unreplaced chlorine, bromine, or iodine atoms, preferably not over 10 to 40 molar percent of such atoms based on total halogen content of the complex. This catalyst system is characterized by being a highly active catalyst system for polymerizing vinyl alkyl ethers in particular, and in polymerization processes in general, while at the same time being insoluble in the commonly used polymerization solvents, such as benezene, toluene, methyl chloride, methylene chloride, hexane, heptane, etc. Being insoluble renders these catalyst materials useful in heterogeneous reaction systems, that is, in polymerization reaction systems which have insoluble active catalyst sites therein. Being insoluble also gives these catalyst materials the advantage of being readily separable from the polymer product.

In addition to the above given advantages, it has been found that the present complex catalysts of this invention allow for and catalyze vinyl ether polymerization reactions at ordinary, or moderately increased temperatures, say, within the range of $-20°$ C. to $100°$ C. thus making the use of low temperatures, such as polymerization temperatures on the order of from $-60°$ C. to $-30°$ C. or lower unnecessary.

The catalyst composition of this invention comprises a chemically-bonded complex of an aluminum alkoxide and an aluminum halide, the predominant portion of the halide being fluoride, any remaining halide being unreplaced chloride, bromide, or iodide from the starting material. This catalytic-complex composition may be prepared by combining an aluminum alkoxide having from 1 to 12 carbon atoms in each alkoxide radical with aluminum chloride, aluminum bromide, or aluminum iodide in an intimate mixture, for example, by grinding the two solid materials together and by fusing the mixture. They can be combined in any desired proportions on the order of from about 1 molar proportion of the aluminum alkoxide to from 0.90 to 5 molar proportions of the aluminum halide. As stated by the Kraus et al. patent, supra, a mixture or complex of this type has high solubility in various solvents and is dissolved in a solvent such as a hydrocarbon, for example, benzene, or an alkyl halide, for example, ethyl chloride. This solution is then treated in accordance with this invention at a low temperature, say from $0°$ C. down to $-80°$ C. with a fluorinating agent such as boron trifluoride or hydrogen fluoride, etc. and then allowing the temperature to rise slowly to room temperature, or to the boiling point of the solvent if the solvent boils at near room temperature or below. While warming up, an in situ halogen exchange takes place. Stoichiometric proportions of the halogen bearing reactants may be used but when essentially complete replacement of all the chlorine, bromine or iodine in the complex is desired, an excess of the fluorinating agent is generally used. During the course of the fluorinating reaction, the catalyst material, that is, the aluminum alkoxide/aluminum fluoride complex, permissibly containing minor amounts of adhering or complexed aluminum chloride, bromide, or iodide precipitates is formed, and is so finely divided, absorptive and of such high surface area that a gel results. The solvent, the by-product chlorine, bromine or iodine containing compound, and any excess fluorinating agent are removed from the reaction medium by filtration, or if the materials are volatile, by evaporation under reduced pressure to obtain a dry, free-flowing, finely divided powdery product. Usually, it is preferred to remove essentially all of the by-product materials from the catalyst; however, trace quantities that are absorbed upon the catalyst's surface apparently have no seriously adverse effects on catalytic activity. Alternatively, the gel-like material, obtained as a result of the fluorinating reaction, can be added to an inert saturated aliphatic hydrocarbon diluent. The by-product boron trichloride, for example, when boron trifluoride is used as a fluorinating agent, and any excess fluorinating agent, are then volatilized from the diluent and the catalyst is obtained as an extremely finely divided dispersion in the hydrocarbon diluent. The catalyst prepared by this method is so finely divided that the dispersion appears turbid and settles very slowly. The catalyst so prepared can be deposited on an inert carrier, for example, alumina, carbon, silica, or asbestos, or mixtures thereof and such combinations are included within the scope of this invention.

Polymerization of monomeric materials, particularly vinyl alkyl ether monomers, in the presence of the presently provided catalyst system, may be conducted over a rather broad range of reaction temperatures on the order from about −30° C. to 100° C. Thus, conveniently, the polymerization of vinyl alkyl monomers may be accomplished at moderate temperatures on the order of about 0–50° C. which are preferred. Contrary to prior art teachings, by using the catalyst system of this invention, there can be prepared polymers having characteristic properties not possessed by the polyvinyl ether polymers of the prior art. The polymer products produced by the process of this invention have a high degree of crystallinity when prepared and furthermore, give crystalline X-ray diffraction patterns when examined as fiber or film without prior orientation, as by stretching for example.

Polymers of vinyl alkyl ether previously known have been characterized by water solubility at temperatures below 35° C. or by acetone solubility. The polyvinyl alkyl ether products obtained by using the catalyst system of this invention are of high molecular weight, and exhibit crystalline patterns when examined in the unstretched condition by X-ray diffraction techniques. Further, they do not dissolve in water, even at 35° C. or lower. This property greatly extends the area and usefulness of these polyvinyl alkyl ethers in wrapping fields, for example, where a water soluble film would be completely unsatisfactory. The crystalline polyvinyl methyl ether produced by the method of this invention is insoluble in acetone, which further distinguishes it from prior art polymers.

Vinyl alkyl ether polymers, prepared according to this invention, exhibit irreversible extensibility due to the "necking down" phenomenon. Beyond this limit, the polymer produced hereby is flexible and has rubbery characteristics while retaining a high tensile strength. When processed to a film, it is non-tacky, tough and is highly transparent.

The presently provided complex catalyst system may be used as the sole or only catalyst, or as may be preferred for some polymerization reactions, the catalyst may be used in combination with other added compounds referred to generally as co-catalysts. The by-products formed in the reaction of the various fluorinating agents with the aluminum chloride, bromide, or iodide of the complex starting material have been absorbed on the catalyst surface in trace quantities. For example, when boron trifluoride was reacted with the aluminum chloride of the complex to give the fluorine-containing complex, small amounts of boron have been determined to be present by the analysis of the complex. The boron trichloride thus absorbed has no deleterious effect but actually functions as a co-catalyst. In a similar manner, when anhydrous hydrofluoric acid is used to convert the aluminum chloride of the complex to the aluminum fluoride, according to this invention, trace quantities of hydrochloric acid and hydrofluoric acid have been absorbed on the catalyst surface function as co-catalysts.

Co-catalysts having pronounced activity in the polymerization reactions include many of the accepted Friedel-Crafts type compounds, for example, an active halide compound. By active halide compound is meant the halide compounds known to have activity as Friedel-Crafts catalysts. The mechanism of action of these compounds is not fully understood, but it has been described as a co-catalytic or activation effect. The reaction rate and conditions of temperature and pressure can be modified by the addition of one or more of these active halide compounds which serve as co-catalysts or activators in the polymerization systems. Typical examples of the applicable active halide compounds include antimony pentachloride, antimony trichloride, tin tetrachloride, titanium tetrachloride, silicon tetrachloride, ferric chloride, aluminum bromide, chromium trichloride, zirconium tetrachloride, and zinc chloride. The catalyst complex compositions of this invention have high activity in the polymerization of aliphatic mono- and diolefins having a methylene group doubly bonded to carbon. For example, high molecular weight solid, linear polymer can be prepared from ethylene or butadiene monomers by the use of catalysts of this invention. These catalyst compositions, especially those in which are contained significant amounts of another halogen in addition to fluorine, are also effective when used to polymerize propylene, 1-butene, isobutylene, diolefins such as isoprene, butadiene, bicycloheptadiene, dimethylbutadiene and mixtures of these monomers, to high molecular weight polymers.

As a further embodiment of this invention the catalysts described herein are also effective as catalysts in the preparation of copolymers and can be used for polymerizing monoolefins with conjugated aliphatic diolefins. High molecular weight copolymers can be prepared by using the catalysts of this invention from isobutylene-isoprene, isobutylene - butadiene, propylene - isoprene, propylene-butadiene, and ethylene-butadiene as typical examples. Copolymers can be prepared from bicycloheptadiene-isoprene and from bicycloheptadiene-butadiene by the use of the catalysts of this invention.

While the catalysts of this invention have been shown to have particular utility as polymerization catalysts, they are also useful in Friedel-Crafts reactions. These materials can be used as catalysts for the alkylation of aromatic compounds with aliphatic olefins, alkyl halides, or aliphatic alcohols. These catalyst compositions can also be used in reactions of acid chlorides or acid anhydrides with aromatic compounds to synthesize ketones. In general, these catalysts can be utilized in any Friedel-Crafts type reaction and are advantageous in that they induce fewer side reactions than aluminum chloride. These catalysts can also be used as isomerization catalysts and disproportionation catalysts.

To illustrate the preparation of the catalyst complex compositions of this invention the following example is typical:

Example 1

Aluminum chloride ($AlCl_3$), 4.4 g., and aluminum ethoxide [$Al(OC_2H_5)_3$], 5.4 g., (both in powder form), were mixed and fused at 130° C. The mix was cooled, dissolved in ethyl chloride, and the solution boiled and filtered. The filtrate solution was very clear and almost colorless. An aliquot of this solution was saturated with boron trifluoride gas at −78° C. and the temperature then slowly raised. At about 0° C., the solution turned to a thick gel due to the halogen interchange reaction. The material was reduced to a dry powder by evaporating volatiles under vacuum. This powder was obtained as a very finely divided free-flowing powder, and in essentially quantitative yield based on the aluminum chloride in the complex starting material. The catalyst prepared according to this procedure has been found to have a crystallite size of less than 200 A., as determined by the technique of X-ray diffraction line broadening.

Example 2

To a solution of 20 ml. of vinyl isobutyl ether monomer in 40 ml. of heptane at 25° C. there was added 0.2 g. of the catalyst prepared in Example 1. The mixture was then kept, with occasional shaking, for 8 hours at 25° C. The mixture, which changed to a thick gel due to polymer formation, then was quenched with a large excess of acetone and the insoluble polymer separated by decantation. The polymer was washed three times with boiling acetone, air dried, and a sample pressed into a thin film between polished plates at 160° C. This film "necked down" upon cold drawing. Processing properties of this polymer, i.e., "necking down" phenomenon and high molding temperature requirements, are characteristic of crystalline, high molecular weight polyvinyl isobutyl ether.

Using the same procedure as above except for carrying out the reaction at 0° C., there is obtained an increased quantity of crystalline polymer. Judging by solubility and physical characteristics, it was highly crystalline.

The catalyst complexes of this invention are reactive polymerization catalysts over a wide range of temperatures and pressures. But their particular advantage lies in the fact that they are insoluble in common polymerization solvents and allow for the use of moderate polymerization temperatures while at the same time producing high molecular weight solid crystalline polymers.

The materials which are used to prepare the presently provided catalyst compounds are readily available. Aluminum alcoholates may be obtained by reacting metallic aluminum with the desired alcohol preferably one having from 1 to 5 carbon atoms although alcohols having up to 12 carbon atoms may be used. Such alcohols may be for example, methanol, ethanol, propanol, isopropanol, n-butanol, cyclohexyl alcohol, heptanol, dodecanol, and alcohols of highly branched hydrocarbons, such as propylene tetramer and butylene trimer, etc. Solid aluminum alkoxides may be mixed with aluminum chloride, aluminum bromide, or aluminum iodide. When the aluminum chloride, bromide, or iodide is complexed with the aluminum alkoxide the resulting material is soluble in methyl and ethyl chloride. It is desirable that the presence of moisture be avoided in the reaction zone when preparing these catalysts. Moisture has a detrimental effect, neutralizing the catalyst activity.

While the invention has been described with particular reference to preferred embodiments thereof, in that there has been provided an aluminum alkoxide-aluminum fluoride catalyst, a method for making said catalyst, it will be appreciated that variations from the details given herein can be effected without departing from the invention in its broadest aspects.

I claim:

1. A process for preparing a catalyst complex composition which process comprises contacting a chemically-complexed composition of an aluminum alkoxide having from 1 to 12 carbon atoms in each alkoxide radical and an aluminum halide selected from the group consisting of chloride, bromide and iodide dissolved in a solvent with sufficient fluorinating agent selected from the group consisting of boron trifluoride, and hydrogen fluoride, at a temperature of from −80° C. to 0° C., allowing the temperature to rise to effect an in situ halogen interchange to convert the predominant portion of the aluminum halide of the complex to aluminum fluoride, and then removing any unreacted fluorinating agent and halide containing by-product.

2. A process according to claim 1 wherein the fluorinating agent used is boron trifluoride.

3. A process according to claim 1 wherein the aluminum alkoxide is aluminum ethoxide.

4. A chemical composition comprising a chemically-bonded complex of an aluminum alkoxide having from 1 to 12 carbon atoms in each alkoxide radical, and an aluminum halide, the major proportion of the halide being fluoride, any remainder being selected from the group consisting of chloride, bromide, and iodide, said chemical composition having been prepared by mixing an aluminum alkoxide having from 1 to 12 carbon atoms in each alkoxide radical with an aluminum halide selected from the group consisting of aluminum chloride, aluminum bromide, and aluminum iodide in an intimate mixture in molar proportions on the order of about 1 molar proportion of the aluminum alkoxide to from about 0.9 to 5 molar proportions of the aluminum halide to form a complex, dissolving said complex in a solvent, and contacting said resulting dissolved complex with sufficient fluorinating agent selected from the group consisting of boron trifluoride and hydrogen fluoride at a temperature of from −80° C. to 0° C. and then allowing the temperature to rise, to effect an in situ halogen interchange to convert the predominant portion of the aluminum halide of the aluminum alkoxide-aluminum halide complex to aluminum fluoride, and removing any unreacted fluorinating agent and halide containing by-product whereby a solid aluminum alkoxide-aluminum fluoride-aluminum halide complex is obtained.

5. A chemical composition as descried in claim 4 wherein the aluminum alkoxide is aluminum ethoxide.

6. A composition as described in claim 4 wherein the molar ratio of aluminum alkoxide to aluminum halide is from 1:1 to 1:3.

References Cited by the Examiner

UNITED STATES PATENTS

| | | | |
|---|---|---|---|
| 2,440,750 | 5/1948 | Kraus et al. | 252—429 |
| 2,491,116 | 12/1949 | Kraus et al. | 252—429 |
| 2,537,706 | 1/1951 | Rudoff | 260—91.1 |
| 2,542,610 | 2/1951 | Young | 252—429 |
| 2,799,669 | 7/1957 | Zoss | 260—91.1 |

TOBIAS E. LEVOW, *Primary Examiner.*

HAROLD BURSTEN, J. R. LIBERMAN, *Examiners.*

R. J. BUTTERMARK, R. D. LOVERING,
*Assistant Examiners.*